Patented Jan. 9, 1940

2,186,433

UNITED STATES PATENT OFFICE 2,186,433

PROCESS FOR THE RECOVERY OF ALUMINUM AND FLUORINE COMPOUNDS FROM THE WORN-OUT LININGS OF THE ELECTRIC FURNACES EMPLOYED FOR THE PRODUCTION OF ALUMINUM

Veit Schwemmer, Pirna, in Saxony, Germany, assignor to the firm Rütgerswerke-Aktiengesellschaft, Berlin, Germany No Drawing. Application November 11, 1937, Serial No. 174,022. In Germany November 17, 1936

1 Claim. (Cl. 23—88)

This invention relates to a process for the recovery of aluminum and fluorine compounds from the worn out linings of the electric furnaces employed in the electrolytic production of aluminum.

Furnaces used for the electrolytic production of aluminum are lined with carbon. This carbon lining in time becomes enriched with substances, such as cryolite or alumina, contained in the fused electrolyte and must then be renewed.

According to this invention it has been found that the aluminum compounds, which have accumulated in the worn out lining, which can no longer be used for the production of aluminum, can be recovered therefrom in a simple manner and at the same time be re-converted into a usable form, by extracting the furnace lining, preferably under the application of heat, with aqueous solutions of aluminum salts of mineral acids, if necessary in the presence of free mineral acid, or with free mineral acid alone. The resulting extract is then further worked up into aluminum-fluorine salts, such as cryolite and the like.

The process of this invention is with particular advantage carried out as follows:

The ground furnace lining is extracted under the application of heat with an aluminum salt solution or, since as a rule sufficient $Al_2O_3$ is contained in the lining, with dilute mineral acid, and the resulting extract is stirred with hydrofluoric acid and common sodium chloride solution in such proportions that cryolite is formed, for example in accordance with the equation:

(1) 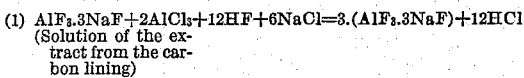
(Solution of the extract from the carbon lining)

The liberated mineral acid (HCl) is employed either for the production of a dilute aluminum salt solution or for the direct extraction of the furnace lining, in the event of the latter already containing the requisite quantity of $Al_2O_3$, which is usually the case.

For the extraction of the furnace lining other aluminum salt solutions may be used, for example aluminum sulphate solution or aluminum nitrate solution. In the place of or together with these aluminum salt solutions diluted mineral acids may be used, for example diluted hydrochloric acid or diluted sulphuric acid or diluted nitric acid. Preferably the extraction is effected at temperatures between 50 and 100° C., but it is also possible to extract the ground lining without the application of external heat.

The precipitation of the aluminum-fluorine salts is effected by stirring the filtered solution of the obtained extract with hydrofluoric acid solution and sodium chloride or another alkali salt, for example sodium sulphate, acid sodium sulphate, sodium nitrate, potassium chloride, potassium sulphate, acid potassium sulphate, potassium nitrate. According to the alkali salt used for precipitation there is formed the corresponding sodium or potassium double salt of aluminum and fluorine, for example cryolite or chiolite. At the same time the corresponding mineral acid is liberated out of the alkali and aluminum salts used for precipitation, for instance according to the following reaction formulas:

(2) 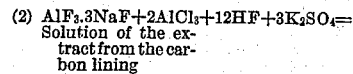
Solution of the extract from the carbon lining

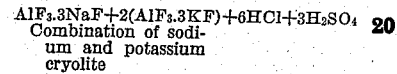
Combination of sodium and potassium cryolite (3) 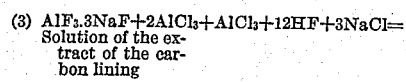
Solution of the extract of the carbon lining

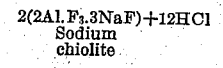
Sodium chiolite

The precipitation of these double compounds takes place at ordinary room temperatures. It is preferred however to precipitate the double compounds at relatively low temperatures, for example at or below 20° C.

The following examples serve to illustrate how the process of this invention may be carried into effect:

(1) 500 kgms. of ground furnace lining, containing 210 kgms. of cryolite, are stirred under the application of heat at 50-100° C. with 2500 litres of aluminum chloride solution containing 4.1% of $Al_2O_3$. The presence of free mineral acid accelerates the process of solution. The filtered solution is stirred at or below 20° C. with 360 kgms. of rock salt and 800 kgms. of 30% hydrofluoric acid, whereby cryolite is precipitated. 635 kgms. of pure cryolite are obtained, approximately 205 kgms. of which are derived from the furnace lining.

(2) The extraction of the ground furnace lining is effected in the same manner as described in Example 1, but without the application of external heat. It takes more time to extract the lining, but in the end a similar result is obtained as in this example and the precipitation of the obtained extract solution is made in the same manner and with the same results.

(3) 300 kgms. of ground carbon lining, containing 99 kgms. of cryolite and 81 kgms. of alumina, are extracted with 1,8 cubic metres of 10% hydrochloric acid at 50-100° C. The carbon residue is almost free from fluorine and aluminum. The filtered solution is with advantage further worked up into cryolite, by stirring with 1600 kgms. of 25% sodium chloride solution and 532 kgms. of 32% hydrofluoric acid preferably after cooling. In this way 402 kgms. of pure cryolite are obtained, of which by reason of the added quantity of HF approximately 98 kgms. of cryolite and all the alumina of the 402 kgms. of cryolite are derived from the furnace lining.

(4) 350 kgms. of ground carbon lining, containing 115 kgms. of cryolite and 111 kgms. of alumina, are extracted with 1520 kgms. of 25% sulphuric acid with the introduction of steam and then filtered. The undissolved black carbon lining residue is practically free from fluorine and contains only a small quantity of excess alumina. The clear solution of the extract is for example further worked up at or below 20° C. into cryolite by stirring with 493 kgms. of 32% hydrofluoric acid and 1600 kgms. of 25% sodium chloride solution, whereby 407 kgms. of pure cryolite are recovered. Corresponding to the quantity of HF added approximately 114 kgms. of cryolite and all the alumina of the 407 kgms. of cryolite are derived from the furnace lining.

I claim as my invention:

A process for the recovery of the aluminum and fluorine compounds from the worn out linings of the electric furnaces employed in the electrolytic production of aluminum, wherein aluminum compounds and fluorides contained in said linings are brought into solution by treating said furnace linings under the application of heat with a diluted aqueous solution containing an acid selected from the group consisting of hydrochloric acid, and sulphuric acid, and containing an aluminum salt of said acids, and precipitating the aluminum and fluorine compounds contained in the extract so obtained by the addition of hydrofluoric acid and an alkali salt.

VEIT SCHWEMMER.